US 6,378,125 B1

(12) United States Patent
Bates et al.

(10) Patent No.: US 6,378,125 B1
(45) Date of Patent: Apr. 23, 2002

(54) DEBUGGER THREAD IDENTIFICATION POINTS

(75) Inventors: Cary Lee Bates, Rochester; Jeffrey Michael Ryan, Byron, both of MN (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/255,139

(22) Filed: Feb. 22, 1999

(51) Int. Cl.[7] .............................................. G06F 9/45
(52) U.S. Cl. .................................. 717/4; 717/6; 717/8
(58) Field of Search ............................. 717/4, 6, 8, 11

(56) References Cited

U.S. PATENT DOCUMENTS

| | | | |
|---|---|---|---|
| 5,297,274 A | 3/1994 | Jackson | 395/500 |
| 5,632,032 A * | 5/1997 | Ault et al. | 709/100 |
| 5,687,375 A | 11/1997 | Schwiegelshohn | 395/704 |
| 5,953,530 A * | 9/1999 | Rishi et al. | 717/4 |
| 6,126,328 A | 11/2000 | Mallory et al. | 395/704 |
| 6,148,381 A | 11/2000 | Jotwani | 711/158 |

OTHER PUBLICATIONS

Savage, "Eraser: A Dynamic Data Race Detector for Multithreaded Programs", ACM Transactions on Computer Systems, pp. 391–411, Nov. 1997.*
Ramsey, "Correctness of Trap–Based Breakpoint Implementations", ACM, pp. 15–24, Jan. 1994.*
Buhr et al., "KDB: a multi–threaded debugger for multi–threaded applications", ACM, pp. 80–87, May 1996.*
Kock et al., "Breakpoints and Breakpoint Detection in Source Level Emulation", IEEE, pp. 26–31, Nov. 1996.*
L. Pitt, Probablilistic inductive inference, ACM, pp. 383–433, Apr. 1989.
Aral et al., "High–level debugging in parasight", Proceedings of the ACM Sigplan and Sigops Workshop on Parallel and distributed debugging, pp. 151–162, May 1988.
Kessler, "Fast Breakpoints: Design and Implementation", ACM, pp. 78–84, Jun. 1990.
Xu et al., "Dynamic Instrumentation of Threaded Applications", ACM, pp. 49–59, 1999.
"The Kernel Kit: Semaphores", http://www.sie.co.jp/HTML/KernelKit/sems.html; download Dec. 14, 1998, pp. 1–9.

* cited by examiner

Primary Examiner—Kakali Chaki
Assistant Examiner—Ted T. Vo
(74) Attorney, Agent, or Firm—Wood, Heron & Evans (57) ABSTRACT

A computer system, program product and method to facilitate debugging of multi-threaded computer programs by identifying threads that interact with program elements such as instructions or variables. For instance, after program execution is halted by a break point, a user may request retrieval of an identification of all threads encountering a certain statement number. Moreover, the program element may be implemented as a thread identification control point in a manner similar to a break point, utilizing a break point table to determine whether a system exception is due to a break point or to a thread identification control point. If the latter, program execution continues after storing the thread identifier in a record for the thread identification control point in the break point table.

21 Claims, 9 Drawing Sheets

```
Debugger                                    _ □ X
File  Edit  Help
1
2
3  foo(semaphore p1)
4 {
5    int i;
6    int j;
7    p(p1);
8    j = global1;
9    i = global2;
10   global 1 = i*2 + j;
11   v(p1);
12   foo2(i);
13   return(j);
14 }

==> Break 13  TIDpt 10
Break set at 13, Thread ID Control point set at 10
```

DEBUGGER THREAD IDENTIFICATION POINTS

FIELD OF THE INVENTION

The invention is generally related to computers and computer software. More specifically, the invention is generally related to monitoring break points used during debugging software, especially in a multi-threaded software environment.

BACKGROUND OF THE INVENTION

Locating, analyzing and correcting suspected faults in a computer program is a process known as "debugging." Typically, a programmer uses another computer program commonly known as a "debugger" to debug a program under development.

Conventional debuggers typically support two primary operations to assist a computer programmer. A first operation supported by conventional debuggers is a "step" function, which permits a computer programmer to process instructions (also known as "statements") in a computer program one-by-one, and see the results upon completion of each instruction. While the step operation provides a programmer with a large amount of information about a program during its execution, stepping through hundreds or thousands of program instructions can be extremely tedious and time consuming, and may require a programmer to step through many program instructions that are known to be error-free before a set of instructions to be analyzed are executed.

To address this difficulty, a second operation supported by conventional debuggers is a break point operation, which permits a computer programmer to identify with a "break point" a precise instruction for which it is desired to halt execution of a computer program during execution. As a result, when a computer program is executed by a debugger, the program executes in a normal fashion until a break point is reached, and then stops execution and displays the results of the computer program to the programmer for analysis.

Typically, step operations and break points are used together to simplify the debugging process. Specifically, a common debugging operation is to set a break point at the beginning of a desired set of instructions to be analyzed, and then begin executing the program. Once the break point is reached, the program is halted, and the programmer then steps through the desired set of instructions line by line using the step operation. Consequently, a programmer is able to quickly isolate and analyze a particular set of instructions without having to step through irrelevant portions of a computer program.

Most break points supported by conventional debuggers are unconditional, meaning that once such a break point is reached, execution of the program is always halted. Some debuggers also support the use of conditional break points, which only halt execution of a program when a variable used by the program is set to a predetermined value at the time such a break point is reached.

Some operating systems, such as UNIX and Windows NT, allow multiple parts, or threads, of one or more processes to run simultaneously. These operating systems are referred to as multi-threaded. This type of parallel processing allows for faster execution of such processes. However, multi-threaded operating systems complicate debugging by making use of break points inefficient. Conventional multi-thread debuggers do not identify the activities of the various control threads. The insight given is limited to listing thread identifiers without any relation to their activities. The user often must painfully set and hit each of a large number of break points to deduce what each thread is doing.

Therefore, a significant need exists for a manner of monitoring the activities of threads so that multi-threaded applications can be debugged more readily.

SUMMARY OF THE INVENTION

The invention addresses these and other problems associated with the prior art by providing an apparatus, program product, and method of debugging a multi-threaded computer program that identify, during execution of the program, threads utilizing program elements such as instructions or variables.

In an illustrative embodiment of the invention, a control point such as a thread identification control point is inserted into the computer program at the location of a particular program element. When a thread identification control point is encountered during program execution, the identifier for the thread causing this encounter is associated with the control point. Then, after program execution is halted, e.g., by a break point, the user may request retrieval of the thread identifiers associated with the control point.

One advantage of identifying threads in the manner disclosed herein is that the activities of the threads becomes more apparent to a user. For example, a user is given insight into which threads read or set a variable or executed certain code. The user need not painfully deduce the thread activities by inserting and monitoring a large number of break points, as would otherwise be required by conventional implementations.

These and other advantages and features, which characterize the invention, are set forth in the claims annexed hereto and forming a further part hereof. However, for a better understanding of the invention, and of the advantages and objectives attained through its use, reference should be made to the drawings, and to the accompanying descriptive matter, in which there are described various embodiments of the invention.

DETAILED DESCRIPTION

Debugging multi-threaded computer programs is aided by identifying threads utilizing program elements such as an instruction or variable so that this information may be later utilized. For instance, after program execution is halted by a break point, the user may request retrieval of the thread identifiers that encountered a certain statement number. Moreover, in the illustrative embodiment, the program element is associated with threads by implementing a thread identification control point in a manner similar to conventional break points at the address for the program element.

Thread identification control points and break points are both examples of control points, which are generally user inserted interruptions to program execution. In the illustrative embodiment, an invalid instruction is inserted at an address corresponding to a statement used in a program. Thus, the invalid instruction causes a hardware interrupt, also referred to as a system exception. Other control point implementations may be used in the alternative.

Figure 1:
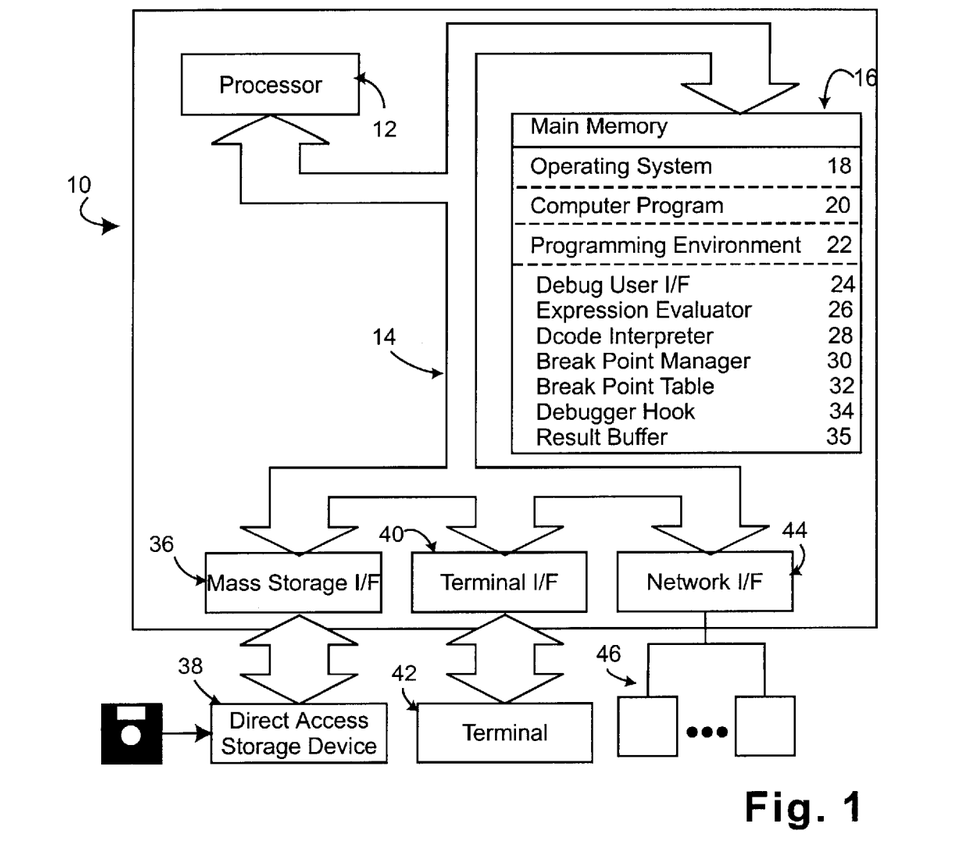
FIG. 1 is a block diagram of a computer system consistent with the invention.

Turning to the Drawings, wherein like numbers denote like parts throughout the several views, FIG. 1 illustrates a computer system 10 consistent with the invention. Computer system 10 is shown for a multi-user programming environment that includes at least one processor 12 which obtains instructions, or op codes, and data via a network 14 from a main memory 16. The processor 12 could be a PC-based server, a minicomputer, a midrange computer, a mainframe computer, etc. The main memory 16 includes an operating system 18, a computer program 20, and a programming environment 22. The programming environment 22 provides a way to debug the computer program 20, or computer code, by providing tools for locating, analyzing and correcting faults. One such tool is thread identification. As will be shown below, this thread identification tool is provided by the cooperation of a debug user interface 24, expression evaluator 26, decode interpreter 28, break point manager 30, break point table 32, debugger hook 34, and result buffer 35.

It should be appreciated that the main memory 16 could be one or a combination of memory devices, including Random Access Memory, nonvolatile or backup memory (e.g., programmable or Flash memories, read-only memories, etc.). In addition, memory 16 may be considered to include memory storage physically located elsewhere in computer system 10, e.g., any storage capacity used as virtual memory or stored on a mass storage device or on another computer coupled to computer system 10 via network 14.

The computer system 10 could include a number of operators and peripheral systems as shown for example by a mass storage interface 36 operably connected to a direct access storage device 38, by a terminal interface 40 operably connected to a terminal 42, and by a network interface 44 operably connected to a plurality of networked devices 46. The terminal 42 and networked devices 46 could be desktop or PC-based computers, workstations, or network terminals, or other networked computer systems.

For purposes of the invention, computer system 10 may represent practically any type of computer, computer system or other programmable electronic device, including a client computer, a server computer, a portable computer, an embedded controller, etc. The computer system 10 may be a standalone device or networked into a larger system.

In general, the routines executed to implement the embodiments of the invention, whether implemented as part of an operating system or a specific application, component, program, object, module or sequence of instructions will be referred to herein as "computer programs," or simply "programs." The computer programs typically comprise one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and nonvolatile memory devices, floppy and other removable disks, hard disk drives, optical disks (e.g., CD-ROM's, DVD's, etc.), among others, and transmission type media such as digital and analog communication links.

In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Figure 2:
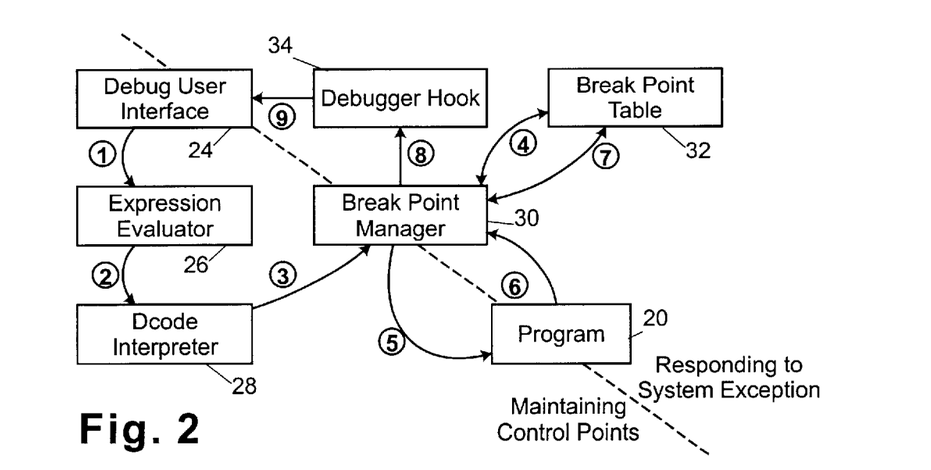
FIG. 2 is a block diagram of an exemplary software environment for the computer system of FIG. 1.

Referring to FIG. 2, an exemplary software environment is shown for the computer system 10 of FIG. 1. Specifically, thread identification capability is illustrated in block diagram form, with the elements shown that contribute to maintaining (e.g., creating and deleting) control points and to responding to a system exception. The debug user interface 24, which may be a third-party debugging program, is shown initiating the process, providing at Phase 1 any control points to be established. For example, a debugger command is made setting a thread identification control point or a break point at a given statement number or a variable. At Phase 2, this debugger command is parsed by the expression evaluator 26 that uses a table that was produced by a compiler stored with the computer program 20 to map the line number in the debugger command to the actual physical storage address in memory 16. The decode interpreter 28 at Phase 3 passes on the control point information to the break point manager 30, which in turn updates the break point table 32 at Phase 4. At Phase 5, the decode interpreter 28 runs a decode program to control the break point manager 30 to set the control points. A more detailed explanation of the expression evaluator 26 and its interaction with the debug user interface 24 and decode interpreter 28 will be discussed below for FIGS. 7–9.

After the control points are set, user provides an input that resumes execution of the program 20. As represented at Phase 6, execution of the program results in an encounter of a control point. In the illustrative embodiment, this is accomplished by an invalid statement in the decode program causing a system exception, similar to a break point. An interrupt handler, or similar means, passes information regarding the exception or interrupt to the break point manager 30. The break point manager 30 references and updates the break point table 32 at Phase 7 as required in order to determine what type of control point was encountered and the associated processing. Then, at Phase 8, the break point manager 30 utilizes the debugger hook 34 in order to obtain debugger commands, especially when a break point has halted program execution. The debugger hook 34 prompts the debug user interface 24 at Phase 9. The additional step of the debugger hook 34 is illustrated for instances where an interface is required between the user interface 24 and the other portions of the programming environment 22. The debugger hook 34 utilizes the result buffer 35 to cache data for the debug user interface 24.

Figure 3:
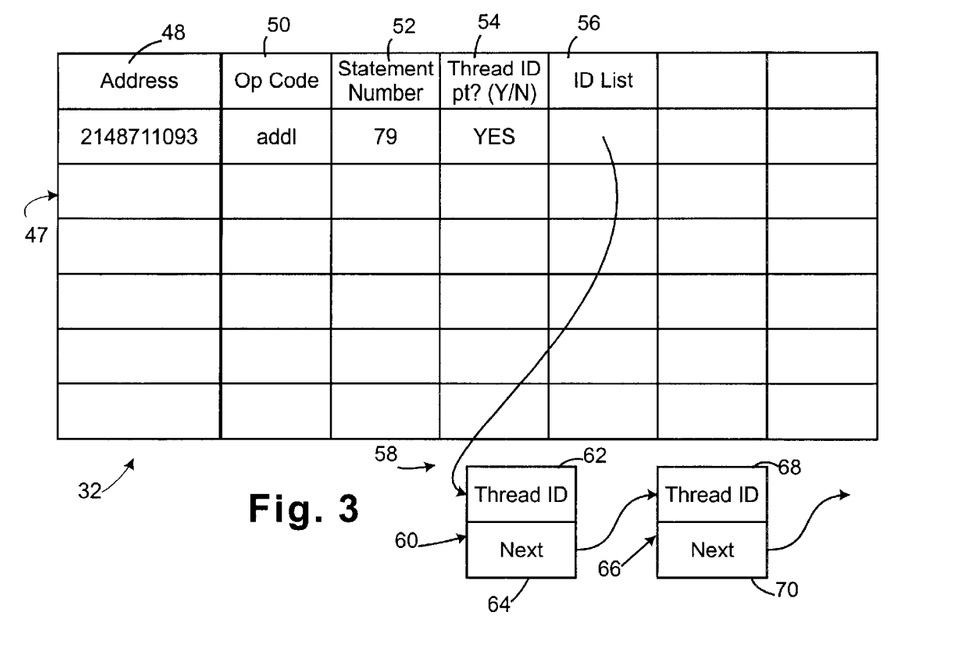
FIG. 3 is a data structure depiction for the break point table of FIGS. 1 and 2.

Referring to FIG. 3, an exemplary data structure for the break point table 32 is shown. Each record 47 in the table includes fields of an address 48, op code 50, statement number 52, thread identification (ID) point flag 54, and pointer 56. The ID list pointer 56 is part of an identification list 58 ("ID list"), wherein the ID list pointer 56 points to a first thread ID record 60, composed of a thread ID 62 and a pointer 64. The pointer 64 points to the next thread ID associated with the address, which in this instance is a second thread ID record 66 composed of a thread ID field 68 and a pointer 70. The linked ID list 58 is terminated by a NULL value either in the ID list pointer 56 for no associated thread identifiers or in a subsequent pointer 52, 58 for the last thread ID record 60, 66.

Figure 4:
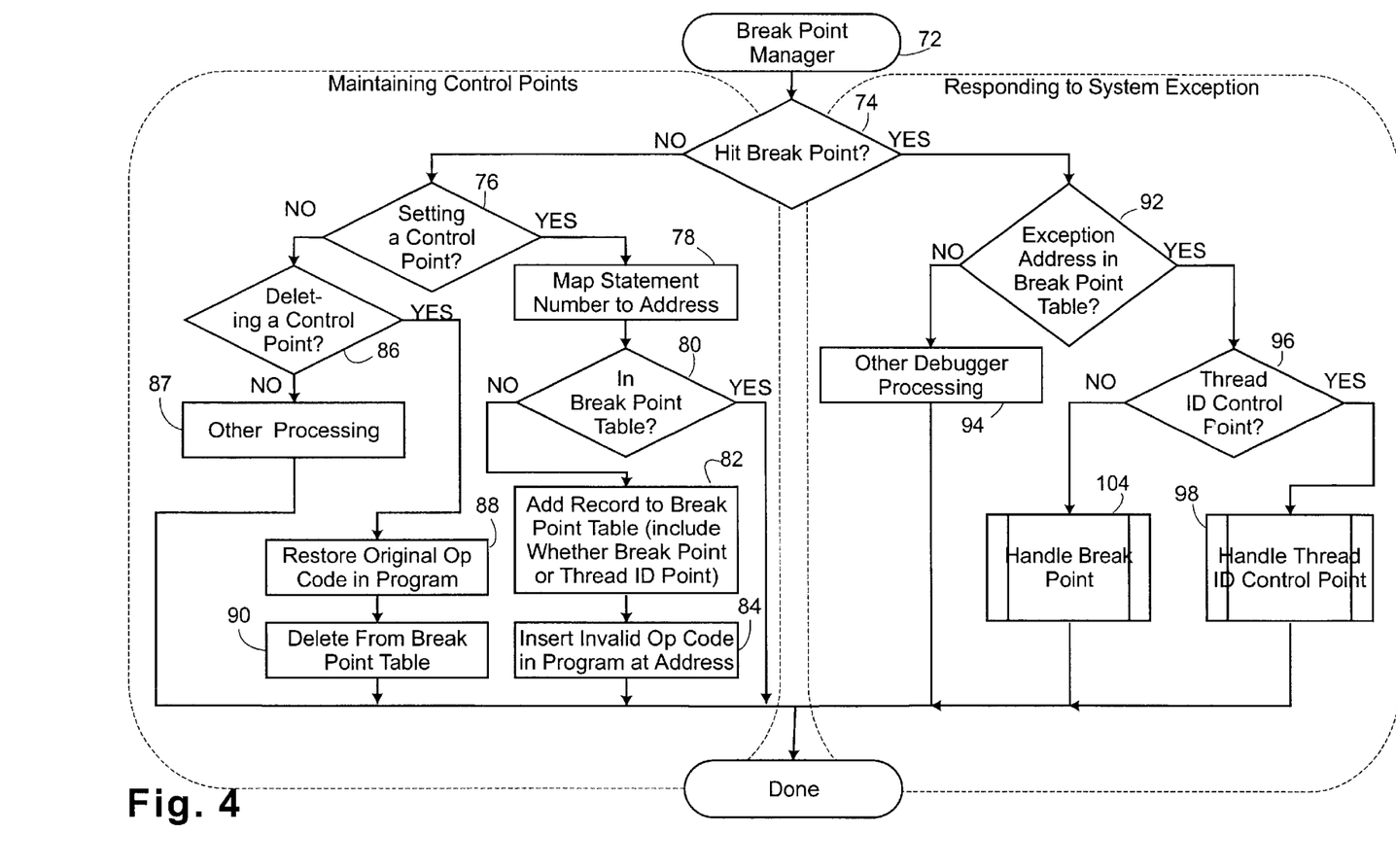
FIG. 4 is a flow diagram for a break point manager routine implemented on the computer system of FIG. 1.

Referring to FIG. 4, a break point manager routine 72 is illustrated wherein two types of break point operations are handled, based on whether the input is due to a break point (i.e., responding to a system exception) or a debugger command (block 74). If the input was not a hit break point in block 74, then a determination is made as to whether a control point is to be set (block 76). If a control point is be set, then the program element for which a control point is to be associated is mapped to a physical address (block 78). Then determination is made as to whether this address is already in the break point table (block 80). Referring to FIG. 3, this means searching each address field 48 to see if the address is included in an address field 48. Returning to FIG. 4, if the address is found in block 80, then routine 72 is done. If, however, the address is not currently in the break point table 32, then a record 47 is added to the break point table 32 (block 82). This record 47 will include data as to whether the control point is to be a thread identification control point, such as by setting high the thread ID control point flag 54 in FIG. 3. Next, the control point is set in the computer program 20. In the illustrative embodiment, setting the control point means inserting an invalid instruction at the address of the statement (block 84) while retaining the original op code in the op code field 50 of the break point table 32. The break point routine 72 is then done for this operation.

Returning to block 76 for the case where a debugger command input is received that is not for setting a control point, then determination is made as to whether a deletion of a control point is commanded (block 86). If not, then the break point manager routine 72 may include other processing (block 87), and routine 72 is done. If the input is to delete a control point in block 86, then the original op code stored in op code field 50 is returned to the original address in the computer program 20 (block 88) and the record deleted from the break point table 32 (block 90) and routine 72 is done for this operation.

Returning to block 74 for the case when the break point routine 72 is responding to hitting a break point (block 74), then a determination is made as to whether the address causing the system exception is contained in the break point table 32 (block 92). If the address is not in the break point table 32, other conventional debugging processing is accomplished (block 94) and routine 72 is done for this operation. For example, the invalid instruction could be a fault in the program code for which an appropriate warning is generated for the user. If in block 92, the address for the exception is found in the break point table, then determination is made as to whether this address is associated with a thread ID control point (block 96). If the exception is a thread ID control point, then the thread ID control point is handled (block 98). If the exception is not a thread ID control point in block 96, then the control point is handled as a break point (block 104).

It should be appreciated that routine 72 is but one suitable implementation of a break point manager 30 consistent with the invention. Other implementations may use, for example, a procedural model. In general, the implementation of a programming environment or other computer program consistent with the invention may utilize any known programming model, and it will be appreciated that such an implementation would be well within the capabilities of one of ordinary skill in the art having benefit of the disclosure presented herein.

Figure 5:
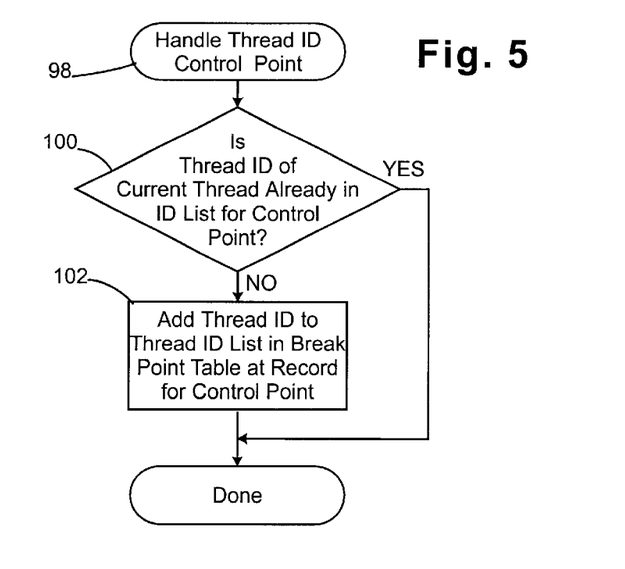
FIG. 5 is a flow diagram of the handle thread ID control point routine referenced in the break point manager routine of FIG. 4.

Referring to FIG. 5, the handle thread ID control point routine 98 referenced in FIG. 4 is illustrated. If the thread ID of the current thread that caused the exception is already in the ID list for the control point (block 100), then routine 98 is complete. If not in the ID list, then the thread ID is added to the ID list in the break point table 32 at the record 47 for the control point (block 102).

Figures 6, 7:
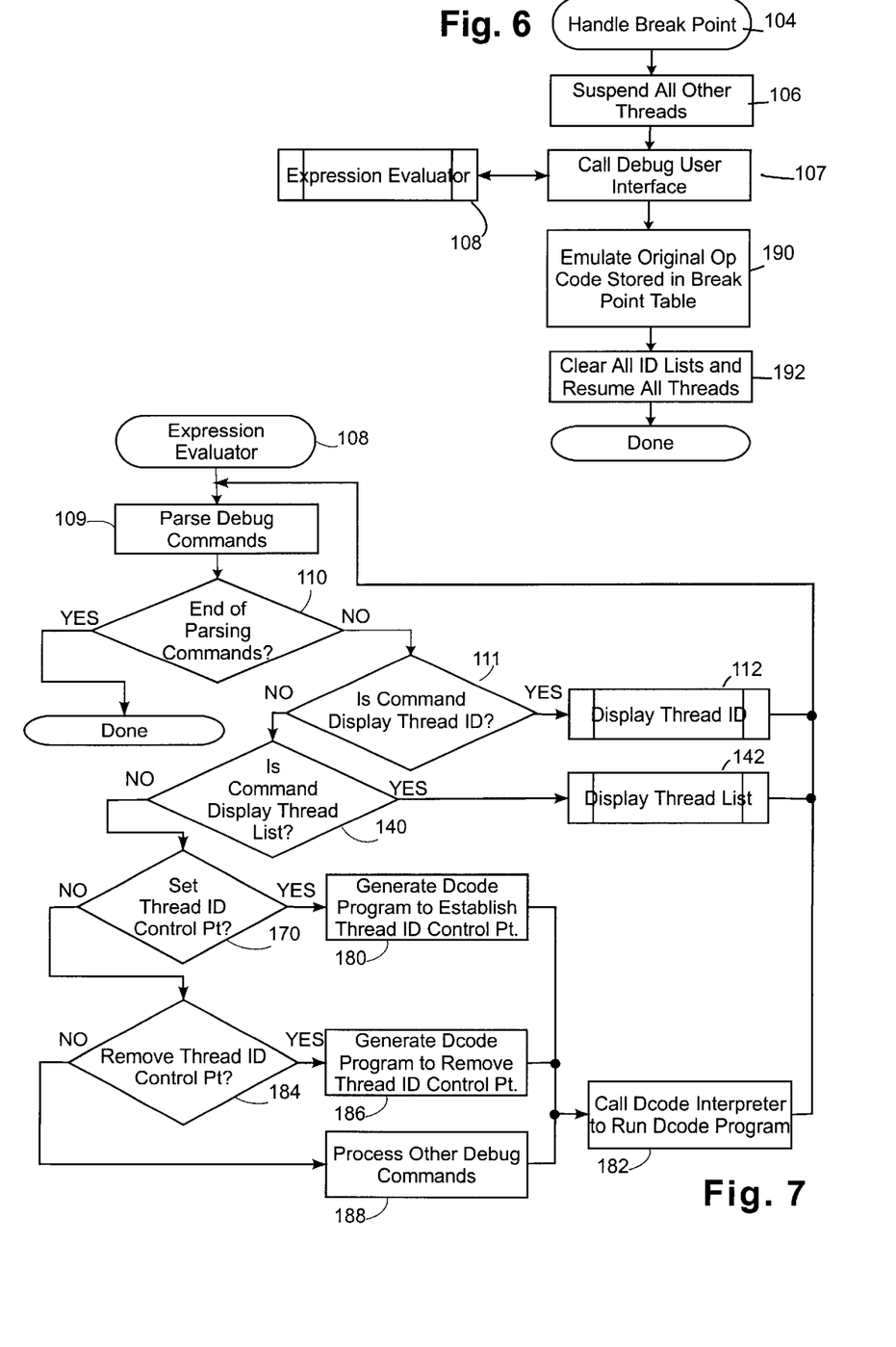
FIG. 6 is a flow diagram for the handle break point routine referenced in the break point manager routine of FIG. 4.
FIG. 7 is a flow diagram for the expression evaluator routine referenced in FIG. 6.

Referring to FIG. 6, the handle break point routine 104 referenced in FIG. 4 is illustrated. First, all other threads are suspended (block 106). Next, the debug user interface 24 is called to see if further debug commands are to be performed (block 107). This interaction with the debug user interface 24 may occur using the debugger hook 34 as previously discussed. An expression evaluator routine (108) thus interacts with block 107 so that these higher level functions may be accomplished prior to recommencing activities by the handle break point routine 104. Typically, after this user interaction, the original op code 50 stored in the break point table 32 for the control point is emulated so that program execution can recommence (block 190) and the linked ID lists 58 for thread identifiers are cleared and all threads unsuspended (block 192). Routine 104 is then done.

Referring to FIG. 7, a simple illustration of the expression evaluator routine 108, referenced in FIG. 6, is shown. First, the debug commands from the debug user interface 24 are parsed (block 109). Then, a determination is made as to whether the end of parsing commands has been reached (block 110), and if so, routine 108 is done. If the parsed command is a command to display thread identifiers stored in an ID list for a thread identification control point (block 111), then display thread ID routine 112 is called, as discussed below for FIG. 8, after which processing returns to block 109 to parse any remaining debug commands. If in block 111 the command was not display thread ID, then in block 140 a determination is made as to whether the command is to display a thread list for all threads associated with the process, and if so, a display thread list routine 142 is called, as discussed below for FIG. 9, and then processing returns to block 109 to parse any remaining debug commands.

If in block 140 the command was not to display a thread list, then the remaining portion of routine 108 shows the expression evaluator 26 and decode interpreter 28 handling establishing and removing thread identification control points or other debug commands, as discussed above. Thus, in block 170, a determination is made as to whether the command is to set a thread identification control point, and if so, a decode program is generated that, when executed, will establish the thread identification control point (block 180). Then, the expression evaluator routine 108 calls the decode interpreter 28 to run the decode program. Processing then returns to block 109 to parse any remaining debug commands.

If in block 170, the command was not to set a thread identification control point, then a determination is made as to whether the command is to remove a thread identification control point (block 184). If to remove, then a decode program is generated that will, when executed, remove the thread identification control point (block 186). Then, processing proceeds to block 182 to have the decode interpreter run the dcode program. If in block 184 the command was not to remove, then other debug commands are processed (block 188) which usually entails generating a decode program. Then processing proceeds to block 182. The break point manager routine 72 discussed above would be performing the corresponding actions with regard to the break point table 32, as discussed for FIG. 4.

Figure 8:
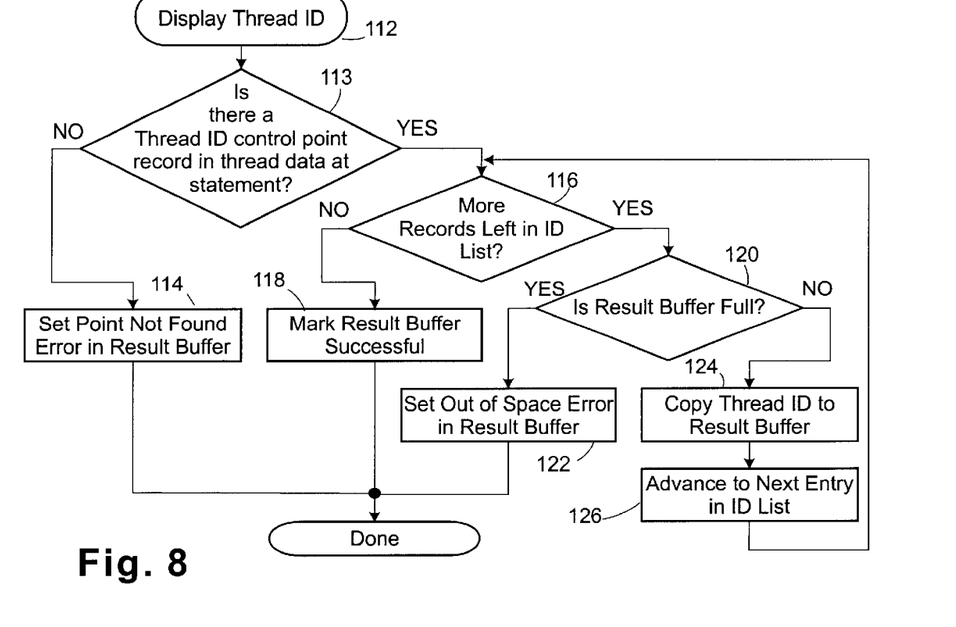
FIG. 8 is a flow diagram for the display thread ID routine referenced in FIG. 7.

Referring to FIG. 8, the display thread ID routine 112 referenced in FIG. 7 is illustrated. In block 113, the break point table 32 is referenced at the requested thread ID control point record 47 for any associated thread IDs stored in the ID list 58. If no corresponding record exists, then a set point not found error is returned in the result buffer 35 to the debug user interface 24 (block 114). If the record was present in the break point table 32, then a determination is made if a stored thread ID in the linked list remains to be forwarded to the result buffer 35 (block 116). If not, then the result buffer 35 is marked as successful (block 118). If more records were left to output in block 116, then a determination is made as to whether the result buffer 35 is full (block 120). If so, an out-of-space error is set in the result buffer 35 (block 122). If the result buffer 35 was not full, then the thread ID is copied to the buffer 35 (block 124) and advancement is made to the next entry in the linked ID list 58 (block 126). Routine 108 is complete.

Figure 9:
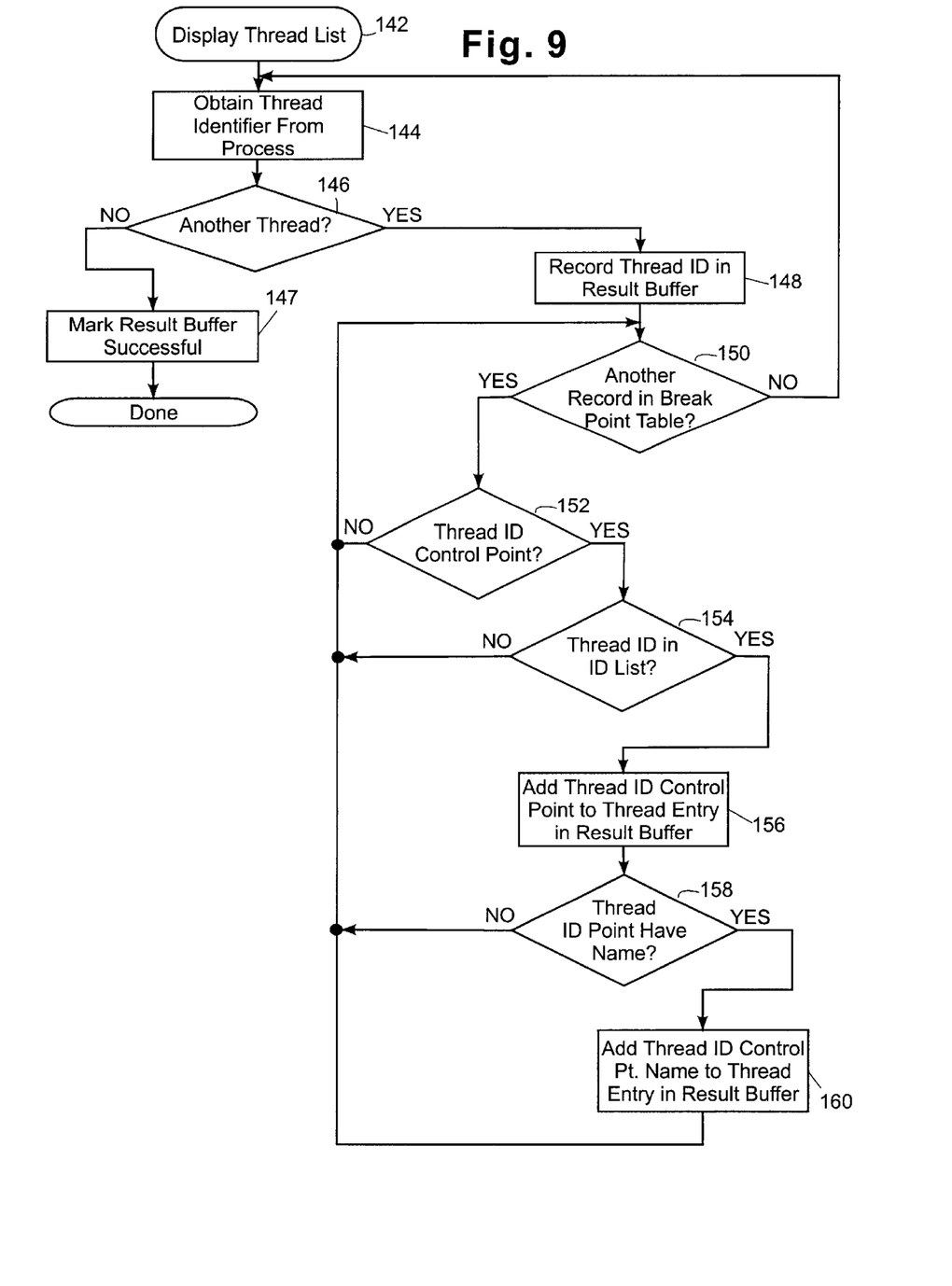
FIG. 9 is a flow diagram for the display thread list routine referenced in FIG. 7.

Referring to FIG. 9, the display thread list routine 142 referenced in FIG. 7 is illustrated. First, the next thread identifier is requested from the process (block 144). During this first pass through block 144, the next thread identifier would be the first thread identifier associated with the process. If in block 146 there was not another thread, then the result buffer 35 is marked successful (block 147) and routine 142 is done.

If there was another thread received (block 146), then the received thread identifier is recorded in a thread entry in the result buffer 35 (block 148). Then, the received thread identifier is compared with each thread identification control point to see if the received thread has hit one of the thread identification control points. Thus, in block 150, a determination is made as to whether there is another record 47 in the break point table 32 to check, thus for the first pass through block 150 another record would refer to the first record. If the break point table 32 is empty during this first pass, or has no unchecked records remaining on subsequent passes, then routine 142 returns to block 144 to receive an additional thread identifier from the process.

If a record is received to check in block 150, then the received record is referenced for being a thread identification control point (block 152). If the received record is not for a thread identification control point, then processing returns to block 150 to check for another record, else, the ID List 56 for the received record is checked to see if it contains the received thread identifier (block 154). If the thread identifier is not found in block 154, then processing returns to block 150 to get the next record, else the thread identification control point is added to the thread entry in the result buffer 32 (block 156). Next, the received record is referenced to determine whether the thread identification control point has an assigned name (block 158), and if so, then the name of the thread identification control point is added to the thread entry in the result buffer 35 (block 160). If no name found in block 158 or after block 160, processing returns to block 150 to get the next record. As described above, routine 142 iterates until all of the thread identifiers associated with the process are received and compared to the ID Lists 56 in the break point table 32.

Generally when debugging a computer program, the user will repetitively execute the code, monitoring the results at various break points. To assist the debugging process, deleting break points, thread identification control points, and/or stored thread identifiers associated with thread identification control points, may be advantageous. Consequently, it is consistent with the invention that each of these items be automatically resettable and/or manually resettable, such as after program execution is halted. In particular, the stored thread identifiers would generally be automatically reset after a break point is encountered, the user has had an opportunity to view the list of thread identifiers for thread identification control points, and program execution is recommenced.

Figure 10:
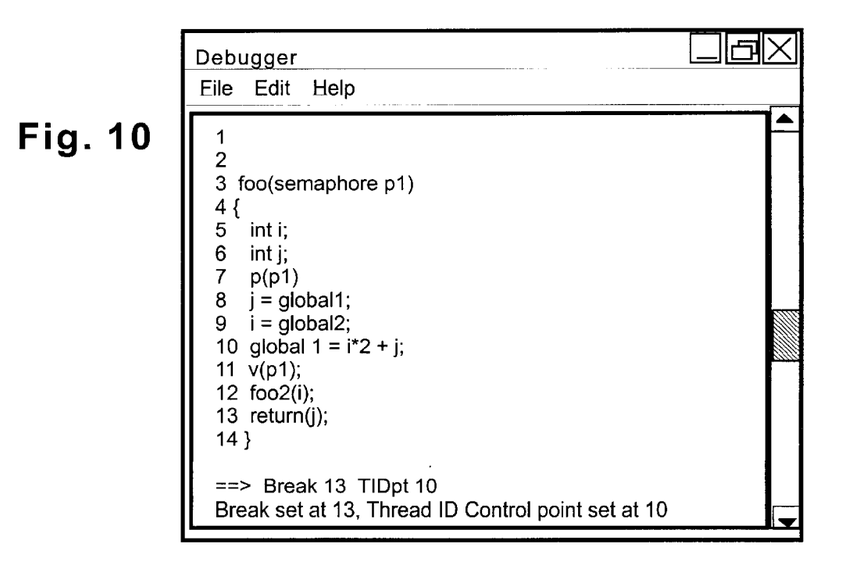
FIG. 10 is an illustrative example of a user interface depiction, consistent with the debug user interface of FIG. 2, showing a computer program and user commands to establish thread identification control points.

Referring to FIG. 10, an illustrative example is provided of a user interface depiction consistent with the invention. A segment of program code is listed in a debugger window. The user inputs a debugger command: "Break 13 TIDpt 10" whereby two control points are to be set, a break point at statement number 13 and a thread ID control point at 10.

Figure 11:
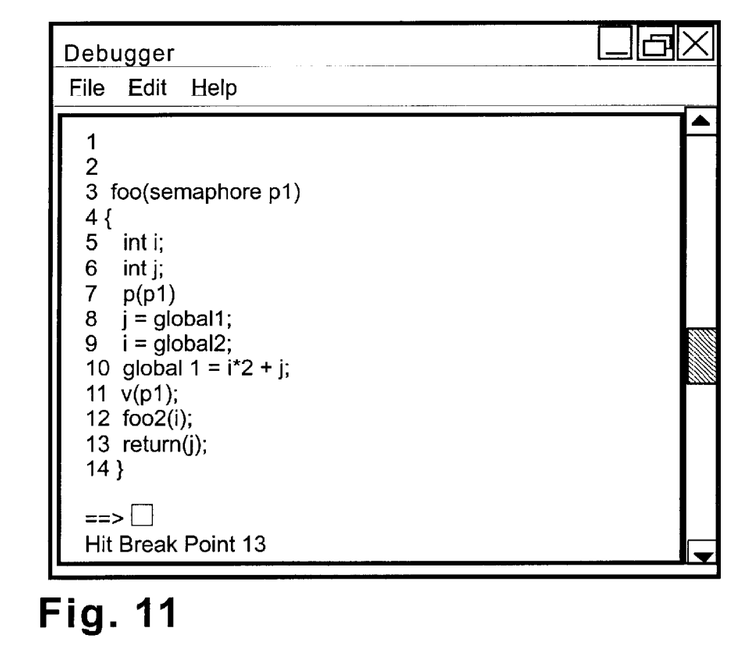
FIG. 11 is the illustrative example of the user interface depiction of FIG. 10 showing the system response to a break point encountered during execution of the computer program.

Referring to FIG. 11, the user interface depiction of FIG. 10 is shown with the dcode program having run until encountering the break point at 13, which is displayed. This corresponds to the Debugger Hook 34 awaiting a command from the debug user interface 24.

Figure 12:
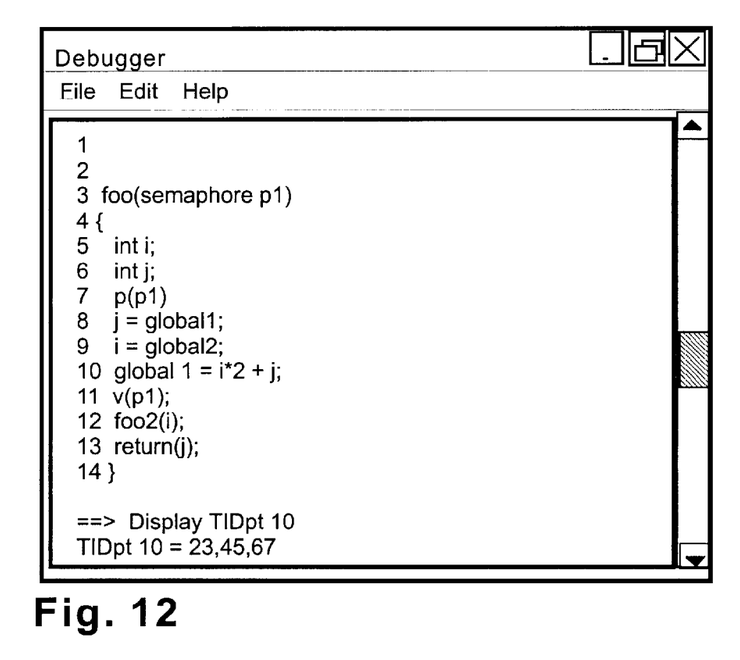
FIG. 12 is the illustrative example of the user interface depiction of FIGS. 10 and 11 showing the system response to list thread identifiers associated with a thread identification control point.

Referring to FIG. 12, the user interface depiction of FIGS. 10 and 11 is shown after the user inputs a debugger command: "Display TIDpt 10" whereby thread IDs associated with a control point, if any, at statement number 10 are to be listed. The break point manager 30 returns "TIDpt 10=23, 45, 67" meaning that threads having identifiers 23, 45 and 67 encountered thread ID control point at 10 at least once prior to the break point at 13 being hit.

Figure 13:
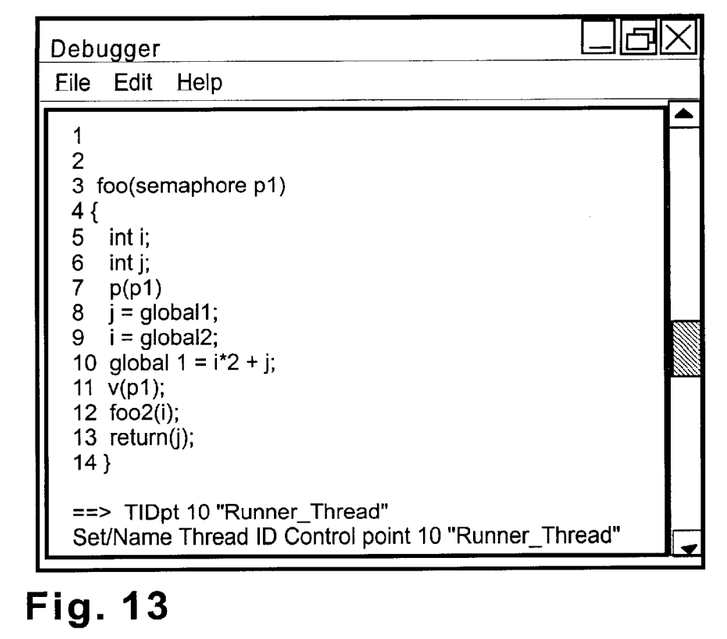
FIG. 13 is an illustrative example of a user interface depiction, consistent with the debug user interface of FIG. 2, showing a computer program and user command to set and name a thread identification control point.

Referring to FIG. 13, an illustrative example is shown of a user interface depiction, consistent with the debug user interface 24 of FIG. 2, showing a computer program and user command to set and name a thread identification control point. Specifically, a command "TIDpt 10 "Runner_ Thread" is input by a user, meaning that a thread identification control point should be made at statement 10 and a name "Runner_Thread" will be assigned.

Figure 14:
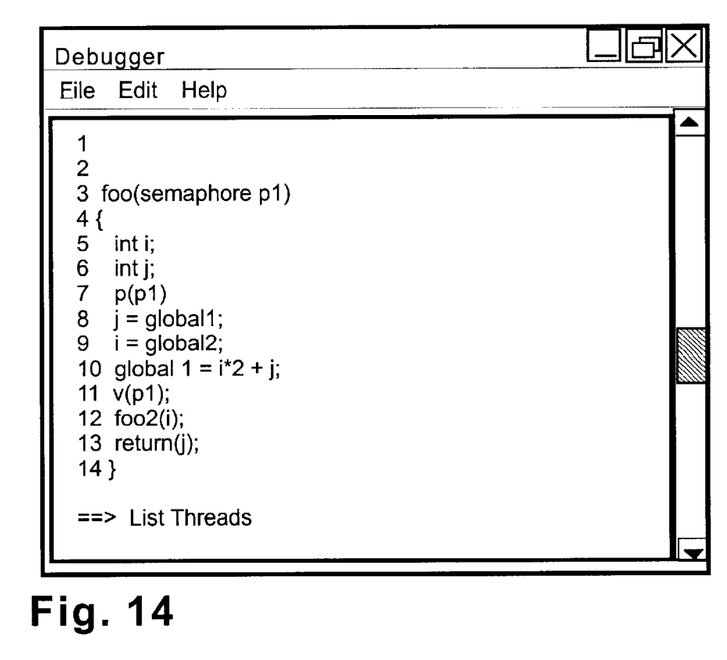
FIG. 14 is an illustrative example of the user interface depiction of FIG. 13 showing the computer program and user command to display thread list.

Referring to FIG. 14, an illustrative example is presented of the user interface depiction of FIG. 13. The figure shows the computer program and a user command "List Threads" to display a list of threads associated with the process.

Figure 15:
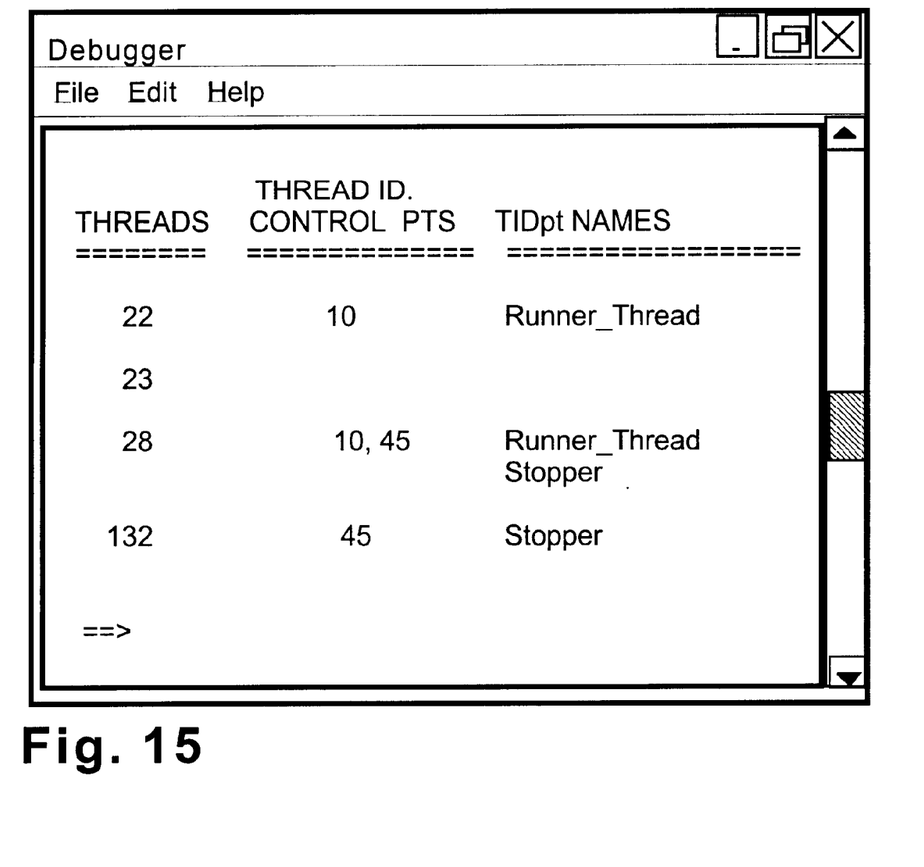
FIG. 15 is the illustrative example of the user interface depiction of FIGS. 13 and 14 showing the system response to display thread list command.

Referring to FIG. 15, an illustrative example is shown of the user interface depiction of FIGS. 13 and 14 providing the system response to display the thread list command. Shown are all of the thread identifiers associated with the process, any thread identification control points hit respectively by the threads, and the name, if any, assigned to the thread identification control points. Specifically, thread identifier 22 is shown hitting thread identification control point 10, named "Runner_Thread". Thread identifier 23 is shown hitting no thread identification control points. Thread identifier 28 is shown hitting thread identification control points 10, named "Runner_Thread", and 45, named "Stopper". Finally, thread identifier 132 is shown hitting thread identification control point 45, named "Stopper".

Various modifications may be made to the illustrative embodiments consistent with the invention. For example, the illustration of a program code listing and a command-line user interface is exemplary. Graphical user interfaces and other similar user interface mechanisms may be used consistent with the invention. In addition, although use of control points at specific statement numbers is illustrated, other software objects may be candidates for control points, including pointers, registers, peripheral device addresses, etc.

In addition, thread identification may include identifying threads that read and/or set a variable. In this instance, a control point in the form of a watch point may be used. Generally, the programming environment 22 includes the capability to declare a watch point for a variable whereupon a system exception is generated when a thread reads or a writes to the address assigned to the variable.

Providing thread identification for usage of a variable may entail the break point manager 30 receiving a command such as "THIDWpt I," meaning set a thread identification watch point for variable i. The break point manager 30 would create a record in the break point table 32 including the address assigned to the variable. The record would also denote this control point as pertaining to a variable. In addition, the break point manager 30 would initiate setting a watch point by having the debug interpreter 28 enable special hardware support (available with many conventional processors) in the processor 12. During execution of the computer program 20, a system exception would occur when the variable is read and/or set. The break point manager 30 would then locate the address for the system exception in the break point table 32 and process as described above. However, since the system exception would be generated by a watch point rather than an invalid op code inserted into the computer program, allowing the thread to continue would not require emulating the original op code.

Other modifications will be apparent to one of ordinary skill in the art. Therefore, the invention lies solely in the claims hereinafter appended.

What is claimed is:

1. A method of monitoring execution of a multi-thread program on a computer system comprising:

creating a thread identification control point by locating an address for a selected program element in the multi-thread program, storing the selected program element and the address in a table, and inserting a control instruction at the address to interrupt program execution;

executing a portion of the multi-thread program after creating the thread identification control point, the multi-thread program including a plurality of threads;

identify each thread that interacts with the selected program element in the multi-thread program while the portion of the multi-thread program is executing; and recommencing execution of the portion of the multi-thread program by discarding a list of identified threads, and unsuspending the plurality of threads.

2. The method of claim 1, wherein the selected program element includes a variable used in the program.

3. The method of claim 1, wherein the selected program element includes a statement in the program.

4. The method of claim 1, further comprising:

in response to encountering a break point in the multi-thread program, suspending the plurality of threads; and displaying the identified threads that interacted with the selected program element.

5. The method of claim 4, wherein displaying the identified threads is in response to a query regarding the selected program element.

6. The method of claim 1, wherein the control instruction at the address is an invalid instruction, causing a system exception that interrupts program execution.

7. The method of claim 1, wherein the recommencing execution of the portion of the multi-thread program includes removal of the selected program element from the table.

8. The method of claim 1, wherein identifying each thread further comprises generating the list of identified threads.

9. The method of claim 8, wherein generating the list of identified threads further comprises generating a list that includes multiple identified threads.

10. The method of claim 1, wherein identifying each thread that interacts with the selected program element in the multi-thread program while the portion of the multi-thread program is executing is performed without halting the multi-thread program to receive user input from a debug user interface.

11. An apparatus comprising:

a memory;

a first, multi-thread program resident in the memory and including a plurality of threads; and a second program, resident in the memory, the second program configured to create a thread identification control point by locating an address for a selected program element in the multi-thread program, storing the selected program element and the address in a table, and inserting a control instruction at the address to interrupt program execution; to execute a portion of the multi-thread program after creating the thread identification control point; to identify each thread that interacts with a selected program element in the multi-thread program while the portion of the multi-thread program is executing; and to recommence execution of the portion of the multi-thread program by discarding a list of identified threads, and unsuspending the plurality of threads.

12. The apparatus of claim 11, wherein the selected program element includes a statement in the multi-thread program.

13. The apparatus of claim 11, wherein the selected program element includes a variable in the multi-thread program.

14. The apparatus of claim 11 wherein the table is configured to store characteristics of the selected program element and identities of threads interacting with the selected program element.

15. The apparatus of claim 11, wherein the second program is configured to identify each thread that interacts with a selected program element in the multi-thread program while the portion of the multi-thread program is executing in response to hitting a thread identification control point in the multi-thread program.

16. The apparatus of claim 11, wherein the thread identification control point includes an invalid instruction, causing a system exception that interrupts program execution.

17. The apparatus of claim 16 wherein the thread identification control point is differentiated from a break point by recording the thread identification control point in the table.

18. A program product, comprising:
a first program configured to execute a portion of a second multi-threaded program, the second program including a plurality of threads; the first program further configured to create a thread identification control point prior to executing the portion of the second program by locating an address for a selected program element in the second program, storing the selected program element and the address in a table, and inserting a control instruction at the address to interrupt program execution; to identify each thread that interacts with the selected program element in the second program while the portion of the second program is executing; and to recommence execution of the portion of the second program by discarding a list of identified threads, and unsuspending the plurality of threads; and
a signal bearing media bearing the first program.

19. The program product of claim 18, wherein the signal bearing media includes transmission type media.

20. The program product of claim 18, wherein the signal bearing media includes recordable media.

21. A method of monitoring execution of a multi-thread program on a computer system comprising:
executing a portion of the multi-thread program, the multi-thread program including a plurality of threads; and
identifying each thread that interacts with a selected program element in the multi-thread program while the portion of the multi-thread program is executing;
wherein executing the portion of the multi-thread program is preceded by:
creating a thread identification control point by:
locating an address for the program element in the program;
storing the program element and the address in a table; and
inserting a control instruction at the address to interrupt program execution; and
wherein identifying each thread further comprises:
in response to program execution being interrupted at the address, storing an identifier for a currently executing thread in the table in a record associated with the program element; and
emulating execution of the program element so that program execution may continue.

* * * * *

UNITED STATES PATENT AND TRADEMARK OFFICE
CERTIFICATE OF CORRECTION

PATENT NO. : 6,378,125 B1
DATED : April 23, 2002
INVENTOR(S) : Cary Lee Bates and Jeffrey Michael Ryan It is certified that error appears in the above-identified patent and that said Letters Patent is hereby corrected as shown below:

Column 10,
Line 8, "identify" should be -- identifying --.

Signed and Sealed this

Eighteenth Day of June, 2002

Attest:

JAMES E. ROGAN
Attesting Officer
Director of the United States Patent and Trademark Office